US011017309B2

(12) United States Patent
Roques-Carmes et al.

(10) Patent No.: US 11,017,309 B2
(45) Date of Patent: May 25, 2021

(54) OPTICAL ISING MACHINES AND OPTICAL CONVOLUTIONAL NEURAL NETWORKS

(71) Applicant: Massachusetts Institute of Technology, Cambridge, MA (US)

(72) Inventors: Charles Roques-Carmes, Cambridge, MA (US); Yichen Shen, Cambridge, MA (US); Li Jing, Cambridge, MA (US); Tena Dubcek, Cambridge, MA (US); Scott A. Skirlo, Boston, MA (US); Hengameh Bagherianlemraski, Cambridge, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 240 days.

(21) Appl. No.: 16/032,737

(22) Filed: Jul. 11, 2018

(65) Prior Publication Data
US 2019/0019100 A1    Jan. 17, 2019

Related U.S. Application Data

(60) Provisional application No. 62/531,217, filed on Jul. 11, 2017.

(51) Int. Cl.
*G06E 3/00* (2006.01)
*G06N 10/00* (2019.01)
(Continued)

(52) U.S. Cl.
CPC ............ *G06N 10/00* (2019.01); *G06N 3/0445* (2013.01); *G06N 3/0454* (2013.01);
(Continued)

(58) Field of Classification Search
CPC ...... G06N 5/003; G06N 5/025; G06N 3/0445; G06N 3/0675; G06N 3/006; G06N 3/067;
(Continued)

(56) References Cited

U.S. PATENT DOCUMENTS 4,567,569 A    1/1986  Caulfield et al.
4,588,255 A *  5/1986  Tur ......................... G06E 3/001
                                                                    385/24
(Continued)

FOREIGN PATENT DOCUMENTS

CN       101630178 A     1/2010
WO     2005029404 A2     3/2005
(Continued)

OTHER PUBLICATIONS

Mohseni, M. et al., "Environment-assisted quantum walks in photosynthetic complexes", The Journal of Chemical Physics 129, (May 18, 2008), 8 pages.
(Continued)

*Primary Examiner* — William R Alexander
*Assistant Examiner* — Tamara Y. Washington
(74) *Attorney, Agent, or Firm* — Smith Baluch LLP

(57) ABSTRACT

A photonic parallel network can be used to sample combinatorially hard distributions of Ising problems. The photonic parallel network, also called a photonic processor, finds the ground state of a general Ising problem and can probe critical behaviors of universality classes and their critical exponents. In addition to the attractive features of photonic networks—passivity, parallelization, high-speed and low-power—the photonic processor exploits dynamic noise that occurs during the detection process to find ground states more efficiently.

13 Claims, 7 Drawing Sheets

(51) Int. Cl.
*G06N 3/04* (2006.01)
*G06N 7/00* (2006.01)
*G06N 3/08* (2006.01)
*G06N 3/067* (2006.01)
*G06F 17/16* (2006.01)
*G06F 17/18* (2006.01)

(52) U.S. Cl.
CPC ......... *G06N 3/0472* (2013.01); *G06N 3/0675* (2013.01); *G06N 3/084* (2013.01); *G06N 7/005* (2013.01); *G06F 17/16* (2013.01); *G06F 17/18* (2013.01)

(58) Field of Classification Search
CPC .......... G06N 3/08; G06N 10/00; G06N 20/00; G06N 20/20; G06N 7/005; G06E 1/00; G06E 1/04; G06E 1/045; G06E 3/00; G06E 3/001; G06E 3/003; G06E 3/008; H04B 10/70; H04B 10/1141; H04B 10/07; H04B 10/11; H04B 10/1123; H04B 10/1127; H04B 10/1143; H04B 10/2569; Y10S 977/933; Y10S 977/932; Y10S 370/907; B82Y 10/00; G02F 3/00; G02F 1/225; G02F 1/3511; G02F 1/3526; G02F 1/39; G02F 2001/212; G02F 2001/20
USPC ......................................................... 359/107
See application file for complete search history.

(56) References Cited

U.S. PATENT DOCUMENTS

| | | | |
|---|---|---|---|
| 4,633,428 | A | 12/1986 | Byron |
| 5,004,309 | A | 4/1991 | Caulfield et al. |
| 5,077,619 | A | 12/1991 | Toms |
| 5,095,459 | A | 3/1992 | Ohta et al. |
| 5,428,711 | A | 6/1995 | Akiyama et al. |
| 5,699,449 | A | 12/1997 | Javidi |
| 6,005,998 | A | 12/1999 | Lee |
| 7,173,272 | B2 | 2/2007 | Ralph |
| 7,660,533 | B1 | 2/2010 | Meyers et al. |
| 7,667,995 | B1* | 2/2010 | Leuenberger ........ G06N 10/00 365/106 |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,035,540 | B2 | 10/2011 | Berkley et al. |
| 8,190,553 | B2 | 5/2012 | Routt |
| 8,223,414 | B2 | 7/2012 | Goto et al. |
| 8,386,899 | B2 | 2/2013 | Goto et al. |
| 8,560,282 | B2 | 10/2013 | Macready et al. |
| 8,604,944 | B2 | 12/2013 | Berkley et al. |
| 8,620,855 | B2 | 12/2013 | Bonderson |
| 8,837,544 | B2 | 9/2014 | Santori et al. |
| 9,250,391 | B2 | 2/2016 | McLaughlin et al. |
| 9,354,039 | B2 | 5/2016 | Mower et al. |
| 9,791,258 | B2 | 10/2017 | Mower et al. |
| 9,858,531 | B1* | 1/2018 | Monroe ................ G06N 10/00 |
| 10,268,232 | B2* | 4/2019 | Harris .................... G06E 3/005 |
| 10,359,272 | B2* | 7/2019 | Mower .................. G06N 10/00 |
| 10,608,663 | B2* | 3/2020 | Gould .................. H04B 10/524 |
| 10,634,851 | B2* | 4/2020 | Steinbrecher ...... G02B 6/29355 |
| 2003/0086138 | A1 | 5/2003 | Pittman et al. |
| 2003/0235363 | A1 | 12/2003 | Pfeiffer |
| 2004/0243657 | A1 | 12/2004 | Goren et al. |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0273835 | A1 | 11/2008 | Popovic |
| 2009/0028554 | A1 | 1/2009 | Anderson et al. |
| 2012/0171619 | A1* | 7/2012 | Heyderman ........... B82Y 10/00 430/296 |
| 2013/0011093 | A1 | 1/2013 | Goh et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0118106 | A1 | 4/2016 | Yoshimura et al. |
| 2016/0162798 | A1 | 6/2016 | Marandi et al. |
| 2017/0031101 | A1 | 2/2017 | Miller |
| 2017/0285373 | A1 | 10/2017 | Zhang et al. |
| 2017/0351293 | A1 | 12/2017 | Carolan et al. |
| 2018/0267937 | A1* | 9/2018 | Pelc ....................... G06N 5/003 |
| 2018/0274900 | A1 | 9/2018 | Mower et al. |
| 2018/0335574 | A1 | 11/2018 | Steinbrecher et al. |
| 2019/0266508 | A1* | 8/2019 | Bunyk ................ G06F 11/0751 |
| 2020/0018193 | A1* | 1/2020 | Neiser ..................... F01K 25/08 |

FOREIGN PATENT DOCUMENTS

| | | |
|---|---|---|
| WO | 2006023067 A2 | 3/2006 |
| WO | 2008069490 A1 | 6/2008 |
| WO | 2018098230 A1 | 5/2018 |

OTHER PUBLICATIONS

Moore, Cramming more components onto integrated circuits. Electronics 114-117 (1965).

Mower et al., "High-fidelity quantum state evolution in imperfect photonic integrated circuits," Physical Review A, vol. 92, No. 3, p. 032322,2015. 7 pages.

Mower, J. et al., "Efficient generation of single and entangled photons on a silicon photonic integrated chip", Phys. Rev. A 84, (Oct. 18, 2011), 8 pages.

Nagamatsu et al., A 15-ns 32 32-bit cmos multiplier with an improved parallel structure. In Custom Integrated Circuits Conference, 1989., Proceedings of the IEEE 1989, 10-3 (IEEE, 1989). 4 pages.

Najafi, F. et al., "On-Chip Detection of Entangled Photons by Scalable Integration of Single-Photon Detectors", arXiv:1405.4244 [physics.optics] (May 16, 2014), 27 pages.

Nozaki et al., "Sub-femtojoule all-optical switching using a photonic-crystal nanocavity," Nature Photonics 4, pp. 477-483 (2010).

O'Brien, J. L. et al., "Demonstration of an all-optical quantum controlled-NOT gate", Nature 426, (Feb. 1, 2008), 5 pages.

Orcutt, J. S. et al., "Nanophotonic integration in state-of-the-art CMOS foundries", Optics Express, vol. 19, No. 3, (2011), pp. 2335-2346.

Peng, Implementation of AlexNet with Tensorflow. https://github.com/ykpengba/AlexNet-A-Practical-Implementation (2018). Accessed Dec. 3, 2018. 2 pages.

Pernice, W. et al., "High-speed and high-efficiency travelling wave single-photon detectors embedded in nanophotonic circuits", Nature Communications 3, 1325 (2012), 23 pages.

Peruzzo, A., et al., "Quantum walk of correlated particles", Science 329, (2010), 8 pages.

Politi, A. et al., "Integrated Quantum Photonics", IEEE Journal of Selected Topics in Quantum Electronics, vol. 5, Issue 6, (2009), 12 pages.

Politi, A. et al., "Silica-on-Silicon Waveguide Quantum Circuits", Science 320, (Feb. 1, 2008), 5 pages.

Poon et al., "Neuromorphic silicon neurons and large-scale neural networks: challenges and opportunities," Frontiers in Neuroscience, vol. 5, Article 108, 3 pages (2011).

Prucnal et al., "Recent progress in semiconductor excitable lasers for photonic spike processing," Advances in Optics and Photonics 8, pp. 228-299 (2016).

Psaltis et al., "Holography in artificial neural networks." Landmark Papers on Photorefractive Nonlinear Optics. 1995. 541-546.

Qiao et al., "16×16 non-blocking silicon electro-optic switch based on mach zehnder interferometers," in Optical Fiber Communication Conference, p. Th1C.2, Optical Society of America, 2016. 3 pages.

Ralph, T. C. et al., "Linear optical controlled-NOT gate in the coincidence basis", Phys. Rev. A, vol. 65, (Jun. 20, 2002), p. 062324-1-062324-5.

(56) References Cited

OTHER PUBLICATIONS

Ramanitra et al., "Scalable and multi-service passive optical access infrastructure using variable optical splitters." Optical Fiber Communication Conference. Optical Society of America, 2006, 3 pages.
Raussendorf, R. et al., "A one-way quantum computer", Phys. Rev. Lett. 86, 5188-5191 (2001).
Rechtsman et al., "Photonic floquet topological insulators," Optical Society of America, Technical Digest, 2 pages (2013).
Reck et al., Experimental realization of any discrete unitary operator. Physical review letters 73, 58 (1994).
Reed, G. T. et al., "Silicon optical modulators", Nature Photonics, vol. 4, (2010), pp. 518-526.
Ríos et al., "Integrated all-photonic non-volatile multilevel memory," Nature Photonics 9, pp. 725-732 (2015).
Rogalski, Progress in focal plane array technologies. Progress in Quantum Electronics 36, 342-473 (2012).
Rohit, A. et al., "8×8 space and wavelength selective cross-connect for simultaneous dynamic multi-wavelength routing", In Optical Fiber Communication Conference, OW1C{4 (Optical Society of America, (2013), 3 pages.
Rosenblatt, The perceptron: a probabilistic model for information storage and organization in the brain. Psychologica Review 65, 386 (1958). 23 pages.
Russakovsky et al. ImageNet Large Scale Visual Recognition Challenge. International Journal of Computer Vision (IJCV) 115, 211-252 (2015).
Salandrino, A. et al., "Analysis of a three-core adiabatic directional coupler", Optics Communications, vol. 282, (2009), pp. 4524-4526.
Schaeff et al., "Scalable fiber integrated source for higher-dimensional path-entangled photonic quNits." Optics Express 20.15 (2012): 16145-16153.
Schmidhuber, J., "Deep learning in neural networks: An overview," Neural Networks 61, pp. 85-117 (2015).
Schreiber, A. et al., "Decoherence and Disorder in Quantum Walks: From Ballistic Spread to Localization", Phys. Rev. Lett., 106, (Jan. 13, 2011), 5 pages.
Schwartz, T. et al., "Transport and Anderson localization in disordered two-dimensional photonic lattices", Nature, vol. 446, (Mar. 1, 2007), p. 52-55.
Shafiee et al., "ISAAC: A convolutional neural network accelerator with in-situ analog arithmetic in crossbars," ACM/IEEE 43rd Annual International Symposium on Computer Architecture, In Proc. ISCA, 13 pages (2016).
Shoji, Y. et al., "Low-crosstalk 2×2 thermo-optic switch with silicon wire waveguides," Optics Express 18(9), 9071-9075., published Apr. 15, 2010.
Silver et al. Mastering chess and shogi by self-play with a general reinforcement learning algorithm. arXiv preprint arXiv:1712.01815 (2017). 19 pages.
Silver et al., Mastering the game of go with deep neural networks and tree search, Nature 529, pp. 484-489 (2016).
Silverstone, J. et al., "On-chip quantum interference between silicon photon-pair sources", Nat. Photon., advanced online publication (2013), 5 pages.
Smith et al., "Phase-controlled integrated photonic quantum circuits." Optics Express 17.16 (2009): 13516-13525.
Solli et al., "Analog optical computing." Nature Photonics 9.11 (2015): 704. 3 pages.
Spring, J. B. et al., "Boson sampling on a photonic chip", Science 339, (2013), 24 pages.
Srinivasan et al., 56 Gb/s germanium waveguide electro-absorption modulator. Journal of Lightwave Technology 34, 419-424 (2016).
Steinkraus et al., Using GPUs for machine learning algorithms. In Document Analysis and Recognition, 2005. Proceedings. Eighth International Conference on, 1115-1120 (IEEE, 2005).
Suda et al., "Quantum interference of photons in simple networks." Quantum information processing 12.5 (2013): 1915-1945.
Sun et al., Single-chip microprocessor that communicates directly using light. Nature 528, 534-538 (2015).
Sun, J. et al., "Large-scale nanophotonic phased array", Nature, vol. 493, (Jan. 10, 2013), p. 195-199.
Suzuki, K. et al., "Ultra-compact 8×8 strictly-non-blocking Si-wire PILOSS switch," Optics Express 22(4), 3887-3894 (2014).
Sze et al., Efficient processing of deep neural networks: A tutorial and survey. Proceedings of the IEEE 105, 2295-2329 (2017).
Tabia,"Experimental scheme for qubit and qutrit symmetric informationally complete positive operator-valued measurements using multiport devices." Physical Review A 86.6 (2012): 062107. 8 pages.
Tait et al., Neuromorphic photonic networks using silicon photonic weight banks. Scientific Reports 7, 7430 (2017). 10 pages.
Tanabe et al., "Fast bistable all-optical switch and memory on a silicon photonic crystal on-chip," Opt. Lett. 30, pp. 2575-2577 (2005).
Tanizawa, K. et al., "Ultra-compact 32×32 strictly-non-blocking Si-wire optical switch with fan-out LGA interposer," Optics Express 23(13), 17599-17606 (2015).
Thompson, M. G. et al., "Integrated waveguide circuits for optical quantum computing", IET Circuits Devices Syst., 2011, vol. 5, Iss. 2, pp. 94-102.
Timurdogan et al., An ultralow power athermal silicon modulator. Nature Communications 5, 4008 (2014). 11 pages.
Wang et al., Deep learning for identifying metastatic breast cancer. arXiv preprint arXiv:1606.05718 (2016).6 pages.
Werbos, Beyond regression: New tools for prediction and analysis in the behavioral sciences. Ph.D. dissertation, Harvard University (1974). 454 pages.
Whitfield, J. D. et al., "Simulation of electronic structure Hamiltonians using quantum computers", Molecular 109, Physics 735 (Dec. 19, 2010), 22 pages.
Xia, F., et al., "Mode conversion losses in silicon-on-insulator photonic wire based racetrack resonators", Optics Express, vol. 14, No. 9, (2006), p. 3872-3886.
Xu et al., "Experimental observations of bistability and instability in a two-dimensional nonlinear optical superlattice," Phys. Rev. Lett. 71, pp. 3959-3962 (1993).
Yang, M. et al., "Non-Blocking 4×4 Electro-Optic Silicon Switch for On-Chip Photonic Networks", Opt. Express, vol. 19, No. 1, (Dec. 20, 2010), p. 47-54.
Yao et al., Serial-parallel multipliers. In Signals, Systems and Computers, 1993. 1993 Conference Record of the Twenty-Seventh Asilomar Conference on, 359-363 (IEEE, 1993).
Young et al., Recent trends in deep learning based natural language processing. IEEE Computational Intelligence Magazine 13,55-75 (2018).
Zhou, X.-Q., et al., "Calculating Unknown Eigenvalues with a Quantum Algorithm", Nat. Photon 7, (2013), pp. 223-228.
Harris, N.C. et al. "Efficient, Compact and Low Loss Thermo-Optic Phase Shifter in Silicon", Optics Express, (Oct. 14, 2014), pp. 10487-10493.
Hinton et al., "Reducing the dimensionality of data with neural networks," Science 313, pp. 504-507 (2006).
Hochberg, M. et al., "Silicon Photonics: The Next Fabless Semiconductor Industry", Solid-State Circuits Magazine, IEEE 5, 48 (Feb. 4, 2013), 11 pages.
Hong, C. K. et al., "Measurement of subpicosecond time intervals between two photons by interference", Phys. Rev. Lett., vol. 59, No. 18, (Nov. 2, 1987), p. 2044-2046.
Horowitz, Computing's energy problem (and what we can do about it). In Solid-State Circuits Conference Digest of Technical Papers (ISSCC), 2014 IEEE International, 10-14 (IEEE, 2014).
Horst, F. et al., "Cascaded Mach-Zehnder wavelength filters in silicon photonics for low loss and flat pass-band WDM (de-)multiplexing", Optics Express, vol. 21, No. 10, (Mar. 5, 2013), pp. 11652-11658.
Humphreys, P. C. et al., "Linear Optical Quantum Computing in a Single Spatial Mode", arXiv:1305.3592, (Nov. 21, 2013), 7 pages.
Inagaki et al., Large-scale ising spin network based on degenerate optical parametric oscillators. Nature Photonics 10, 415 (2016).
International Search Report and Written Opinion in PCT/US2018/041640 dated Nov. 7, 2018 , 14 pages.
Jaekel et al., Quantum limits in interferometric measurements. EPL (Europhysics Letters) 13, 301 (1990).

(56) References Cited

OTHER PUBLICATIONS

Jalali, B. et al., "Silicon Photonics", Journal of Lightwave Technology, vol. 24, No. 12, (Dec. 2006), pp. 4600-4615.
Jia et al., "Caffe: Convolutional architecture for fast feature embedding," In Proceedings of the 22Nd ACM International Conference on Multimedia, MM '14, pp. 675-678 (ACM, New York, NY, USA, 2014). URL http://doi.acm.org/10.1145/2647868.2654889.
Jiang, L. et al., "A planar ion trapping microdevice with integrated waveguides for optical detection", Optics Express, vol. 19, No. 4, (2011), pp. 3037-3043.
Jonsson, An empirical approach to finding energy efficient ADC architectures. In Proc. of 2011 IMEKO IWADC & IEEE ADC Forum, 1-6 (2011).
Jouppi et al. In-datacenter performance analysis of a tensor processing unit. In Computer Architecture (ISCA), 2017 ACM/IEEE 44th Annual International Symposium on, 1-12 (IEEE, 2017).
Kahn et al., Communications expands its space. Nature Photonics 11, 5 (2017). 4 pages.
Keckler et al., GPUs and the future of parallel computing. IEEE Micro 7-17 (2011).
Kieling, K. et al., "On photonic Controlled Phase Gates", New Journal of Physics, vol. 12, (Jul. 5, 2010), 9 pages.
Kilper et al., Optical networks come of age, Opt. Photon. News, vol. 25, pp. 50-57, Sep. 2014.
Kim et al., A functional hybrid memristor crossbar-array/cmos system for data storage and neuromorphic applications. Nano Letters 12, 389-395 (2011).
Knill, E. et al., "A scheme for efficient quantum computation with linear optics", Nature 409, 4652 (Jan. 4, 2001), p. 46-52.
Knill, E., "Quantum computing with realistically noisy devices", Nature, vol. 434, (Mar. 3, 2005), p. 39-44.
Koos et al., Silicon-organic hybrid (SOH) and plasmonic-organic hybrid (POH) integration. Journal of Lightwave Technology 34, 256-268 (2016).
Krizhevsky et al., Imagenet classification with deep convolutional neural networks. In Advances in neural information processing systems, 1097-1105 (2012).
Kucherenko, S. et al., "Application of Deterministic Low-Discrepancy Sequences in Global Optimization", Computational Optimization and Applications, vol. 30, (2005), p. 297-318.
Kwack, M-J et al., "Monolithic InP strictly non-blocking 8×8 switch for high-speed WDM optical interconnection," Optics Express 20(27), 28734-28741 (2012).
Lahini, Y. et al., "Anderson Localization and Nonlinearity in One-Dimensional Disordered Photonic Lattices", Phys. Rev. Lett., 100, (Feb. 7, 2008), 4 pages.
Lahini, Y. et al., "Quantum Correlations in Two-Particle Anderson Localization", Phys. Rev. Lett., 105, (Oct. 15, 2010), p. 163905-1-163905-4.
Laing, A. et al., "High-fidelity operation of quantum photonic circuits", Applied Physics Letters, vol. 97, (2010), 5 pages.
Landauer, Irreversibility and heat generation in the computing process. IBM Journal of Research and Development 5, 183-191 (1961).
Lanyon, B. P. et al., "Towards quantum chemistry on a quantum computer", Nature Chemistry 2, 106 (May 8, 2009), 20 pages.
Lawson et al., Basic linear algebra subprograms for Fortran usage. ACM Transactions on Mathematical Software (TOMS) 5, 308-323 (1979).
Lecun et al., Gradient-based learning applied to document recognition. Proceedings of the IEEE 86, 2278-2324 (1998).
Levi, L. et al., "Hyper-transport of light and stochastic acceleration by evolving disorder", Nat. Phys., vol. 8, (Dec. 2012), p. 912-917.
Li et al., Efficient and self-adaptive in-situ learning in multilayer memristor neural networks. Nature Communications 9, 2385 (2018). 8 pages.
Lin et al., All-optical machine learning using diffractive deep neural networks. Science 361, 1004-1008 (2018).
Lu et al., "16×16 non-blocking silicon optical switch based on electro-optic Mach-Zehnder interferometers," Optics Express, vol. 24, No. 9, 13 pages, DOI:10.1364/OE.24.009295 (Apr. 20, 2016).
Ma et al., "Optical switching technology comparison: optical mems vs. Other technologies," IEEE communications magazine, vol. 41, No. 11, pp. S16-S23, 2003.
Marandi et al., Network of time-multiplexed optical parametric oscillators as a coherent Ising machine. Nature Photonics 8, 937 (2014). 6 pages.
Martin-Lopez, E. et al., "Experimental realization of Shor's quantum factoring algorithm using qubit recycling", Nat Photon 6, (Oct. 24, 2012), 7 pages.
Migdall, A. L. et al., "Tailoring single-photon and multiphoton probabilities of a single-photon on-demand source", Phys. Rev. A 66, (May 22, 2002), 4 pages.
Mikkelsen, J.C. et al., "Dimensional variation tolerant silicon-on-insulator directional couplers", Optics Express, vol. 22, No. 3, (Feb. 10, 2014), p. 3145-3150.
Miller, Are optical transistors the logical next step? Nature Photonics 4, 3 (2010). 3 pages.
Miller, Attojoule optoelectronics for low-energy information processing and communications. Journal of Lightwave Technology 35, 346-396 (2017).
Miller, D. A. B., "Reconfigurable add-drop multiplexer for spatial modes", Optics Express, vol. 21, No. 17, (Aug. 26, 2013), pp. 20220-20229.
Miller, D. A. B., "Self-aligning universal beam coupler", Opt. Express, vol. 21, (Aug. 26, 2013), 6 pages.
Miller, D. A. B., "Perfect optics with imperfect components," Optica 2, pp. 747-750 (2015).
Miller, D. A. B., "Self-configuring universal linear optical component [invited]," Photonics Research 1, URL http://dx.doi.org/10.1364/PRJ.1.000001, 15 pages (2013).
Miller, Energy consumption in optical modulators for interconnects. Optics Express 20, A293-A308 (2012).
Misra et al., "Artificial neural networks in hardware: A survey of two decades of progress," Neurocomputing 74, pp. 239-255 (2010).
Aaronson, S. et al., "Computational complexity of linear optics", in Proceedings of the 43rd Annual ACM Symposium on Theory of Computing (ACM, New York, NY, USA, 2011), STOC '11, pp. 333-342, ISBN 978-1-4503-0691-1.
Abu-Mostafa et al., "Optical neural computers." Scientific American 256.3 (1987): 88-95.
Almeida, V. R., et al., "All-optical control of light on a silicon chip", Nature, vol. 431, (Aug. 6, 2004), pp. 1081-1084.
Amir, A. et al., "Classical diffusion of a quantum particle in a noisy environment", Physical Review, E 79, 050105 (Feb. 5, 2009), 5 pages.
Anitha et al., Comparative study of high performance brauns multiplier using fpga. IOSR J Electron Commun Eng (IOSRJECE) 1, 33-37 (2012).
Appeltant et al., "Information processing using a single dynamical node as complex system," Nature Communications 2, 6 pages (2011).
Arjovsky et al., "Unitary Evolution Recurrent Neural Networks," arXiv:1511.06464, 9 pages (2015).
Aspuru-Guzik A. et al., "Simulated Quantum Computation of Molecular Energies", Science 309, 1704 (2005), 21 pages.
Aspuru-Guzik, A. et al., "Photonic quantum simulators", Nat. Phys., 8, 285 (2012), 29 pages.
Atabaki et al., Integrating photonics with silicon nanoelectronics for the next generation of systems on a chip. Nature 556, 349 (2018). 10 pages.
Baehr-Jones, T. et al., "A 25 Gb/s Silicon Photonics Platform", arXiv:1203.0767 (2012), 11 pages.
Bao et al., "Atomic-Layer Graphene as a Saturable Absorber for Ultrafast Pulsed Lasers," Advanced Functional Materials 19, pp. 3077-3083 (2009).
Bertsimas et al., "Robust optimization with simulated annealing," Journal of Global Optimization 48, pp. 323-334 (2010).
Bewick, Fast multiplication: algorithms and implementation. Ph.D. thesis, Stanford University (1994). 170 pages.

(56) References Cited

OTHER PUBLICATIONS

Bonneau et al., "Quantum interference and manipulation of entanglement in silicon wire waveguide quantum circuits." New Journal of Physics 14.4 (2012): 045003. 13 pages.

Bromberg, Y. et al., "Bloch oscillations of path-entangled photons", Phys. Rev. Lett., vol. 105, (May 18, 2011), 5 pages.

Bromberg, Y. et al., "Quantum and Classical Correlations in Waveguide Lattices", Phys. Rev. Lett. 102, (Jun. 26, 2009), p. 253904-1-253904-4.

Broome, M. A. et al., "Photonic Boson Sampling in a Tunable Circuit", Science 339, 794 (Dec. 20, 2012), 6 pages.

Canziani et al., A. Evaluation of neural network architectures for embedded systems. In Circuits and Systems (ISCAS), 2017 IEEE International Symposium on, 1-4 (IEEE, 2017).

Cardenas, J. et al., "Low loss etchless silicon photonic waveguides", Optics Express, vol. 17, No. 6, (Mar. 16, 2009), pp. 4752-4757.

Caves, Quantum-mechanical noise in an interferometer. Physical Review D 23, 1693 (1981). 16 pages.

Centeno et al., "Optical bistability in finite-size nonlinear bidimensional photonic crystals doped by a microcavity," Phys. Rev., vol. 62, No. 12, pp. R7683-R7686 (2000).

Chan, "Optical flow switching networks," Proceedings of the IEEE, vol. 100, No. 5, pp. 1079-1091, 2012.

Chen et al., DianNao: A small-footprint high-throughput accelerator for ubiquitous machine-learning. ACM Sigplan Notices 49, 269-284 (2014).

Chen, J. et al., "Efficient photon pair sources based on silicon-on-insulator microresonators", SPIE, vol. 7815, (2010), 9 pages.

Chen, J. et al., "Frequency-bin entangled comb of photon pairs from a Silicon-on-Insulator micro-resonator", Optics Express, vol. 19, No. 2, (Jan. 17, 2011), pp. 1470-1483.

Chen, L. et al., "Compact, low-loss and low-power 8×8 braodband silicon optical switch," Optics Express 20(17), 18977-18985 (2012).

Chen, Q. et al., "A Universal method for constructing N-port non-blocking optical router based on 2×2 optical switch", Optics Express 22, 12614 (Aug. 25-28, 2014), p. 357-361.

Chetlur et al., cuDNN: Efficient primitives for deep learning. arXiv preprint arXiv:1410.0759 (2014). 9 pages.

Childs, A. et al., "Spatial search by quantum walk", Physical Review A, 70 (2), 022314 (Aug. 25, 2004), 12 pages.

Chung et al., A monolithically integrated large-scale optical phased array in silicon-on-insulator cmos. IEEE Journal of Solid-State Circuits 53, 275-296 (2018).

Cincotti, "Prospects on planar quantum computing." Journal of Lightwave Technology 27.24 (2009): 5755-5766.

Crespi, A. et al., "Integrated multimode interferometers with arbitrary designs for photonic boson sampling", Nat Photon 7, (May 26, 2013), p. 545-549.

Crespi, et al., "Anderson localization of entangled photons in an integrated quantum walk", Nat Photon 7, 322 (Apr. 3, 2013), 7 pages.

Dai, D. et al., "Novel concept for ultracompact polarization splitter-rotator based on silicon nanowires", Optics Express, vol. 19, No. 11, (May 23, 2011), pp. 10940-10949.

Di Giuseppe, G. et al., "Einstein-Podolsky-Rosen Spatial Entanglement in Ordered and Anderson Photonic Lattices", Phys. Rev. Lett. 110, (Apr. 12, 2013), p. 150503-1-150503-5.

Dunningham et al., "Efficient comparison of path-lengths using Fourier multiport devices." Journal of Physics B: Atomic, Molecular and Optical Physics 39.7 (2006): 1579. 9 pages.

Feinberg et al., Making memristive neural network accelerators reliable. In 2018 IEEE International Symposium on High Performance Computer Architecture (HPCA), 52-65 (IEEE, 2018).

Fushman, I. et al., "Controlled Phase Shifts with a Single Quantum Dot", Science, vol. 320, (May 9, 2008), p. 769-772.

George et al., A programmable and configurable mixed-mode FPAA SoC. IEEE Transactions on Very Large Scale Integration (VLSI) Systems 24, 2253-2261 (2016).

Gilmer et al., Neural message passing for quantum chemistry. arXiv preprint arXiv:1704.01212 (2017). 14 pages.

Golub et al., "Calculating the singular values and pseudo-inverse of a matrix," Journal of the Society for Industrial and Applied Mathematics Series B Numerical Analysis, vol. 2, No. 2, pp. 205-224 (1965).

Graves et al., "Hybrid computing using a neural network with dynamic external memory," Nature, vol. 538, 21 pages (2016).

Green, W. et al., "CMOS Integrated Silicon Nanophotonics: Enabling Technology for Exascale Computational System", IBM Corporation, (Invited Talk at SEMICON 2010, Chiba, Japan, Dec. 1, 2010), 30 pages.

Grote et al., First long-term application of squeezed states of light in a gravitational-wave observatory. Physical Review Letters 110, 181101 (2013). 5 pages.

Gullans, M., et al., "Single-Photon Nonlinear Optics with Graphene Plasmons", Phys. Rev. Lett. 111, (Dec. 13, 2013), p. 247401-1-247401-5.

Gunn, C., "CMOS photonics for high-speed interconnects", Micro, IEEE 26, (Mar.-Apr. 2006), p. 58-66.

Haffner et al., Low-loss plasmon-assisted electro-optic modulator. Nature 556, 483 (2018). 17 pages.

Harris et al. "Integrated source of spectrally filtered correlated photons for large-scale quantum photonic systems." Physical Review X 4.4 (2014): 041047. 10 pages.

Harris et al., "Bosonic transport simulations in a large-scale programmable nanophotonic processor," arXiv preprint arXiv:1507.03406, 2015. 8 pages.

Albert et al., "Statistical mechanics of com-plex networks," Reviews of Modern Physics, vol. 74, pp. 47-97, Jan. 2002.

Amit et al., "Spin-glass models of neural networks," Physical Review A, vol. 32, pp. 1007-1018, Aug. 1985.

Bao et al., "Monolayer graphene as a saturable absorber in a mode-locked laser," Nano Research, vol. 4, pp. 297-307, Mar. 2011.

Barahona, "On the computational complexity of Ising spin glass models," Journal of Physics A: Mathematical and General, vol. 15, pp. 3241-3253, Oct. 1982.

Brilliantov, "Effective magnetic Hamiltonian and Ginzburg criterion for fluids," Physical Review E, vol. 58, pp. 2628-2631, Aug. 1998.

Bruck et al., "On the power of neural networks for solving hard problems," Journal of Complexity, vol. 6, pp. 129-135, Jun. 1990.

Carolan et al., "Universal linear optics," Science, vol. 349, pp. 711-716, Aug. 2015.

Cheng et al., "In-Plane Optical Absorption and Free Carrier Absorption in Graphene-on-Silicon Waveguides," IEEE Journal of Selected Topics in Quantum Electronics, vol. 20, pp. 43-48, Jan. 2014.

Clements et al., "Optimal design for universal multiport interferometers," Optica, vol. 3, p. 1460, Dec. 2016. 6 pages.

E. Ising, "Beitrag zur Theorie des Ferromagnetismus," Z. Phys., 1925. 6 pages.

Esser et al., "Convolutional networks for fast, energy-efficient neuromorphic computing," Proceedings of the National Academy of Sciences 113, 11,441-11,446 (2016).

Farht et al., "Optical implementation of the Hopfield model," Applied Optics, vol. 24, p. 1469, May 1985. 7 pages.

Gruber et al., "Planar-integrated optical vector-matrix multiplier," Applied Optics, vol. 39, p. 5367, Oct 2000. 7 pages.

Halasz et al., "Phase diagram of QCD," Physical Review D, vol. 58, p. 096007, Sep. 1998.

Hamerly et al., "Scaling advantages of all-to-all connectivity in physical annealers: the Coherent Ising Machine vs. D-Wave 2000Q," arXiv preprints, May 2018. 17 pages.

Honerkamp-Smith et al., "An introduction to critical points for biophysicists; observations of compositional heterogeneity in lipid membranes," Biochimica et Biophysica Acta (BBA)—Biomembranes, vol. 1788, pp. 53-63, Jan. 2009.

Hopefield et al., "Neural computation of decisions in optimization problems," Biological Cybernetics, vol. 52, No. 3, pp. 141-152. 1955.

Hopefield, "Neural networks and physical systems with emergent collective computational abilities.," Proceedings of National the Academy of Sciences of the United States of America, vol. 79, pp. 2554-2558, Apr. 1982.

(56) References Cited

OTHER PUBLICATIONS

Isichenko, "Percolation, statistical topography, and trans-port in random media," Reviews of Modern Physics, vol. 64, pp. 961-1043, Oct. 1992.
Kardar et al., "Dynamic Scaling of Growing Interfaces," Physical Review Letters, vol. 56, pp. 889-892, Mar. 1986.
Karpathy, A., "CS231n Convolutional Neural Networks for Visual Recognition," Class notes. Jan. 2018, http://cs231n.github.io/. Accessed Oct. 31, 2018. 2 pages.
Kirkpatrick et al., "Optimization by simulated annealing.," Science (New York, N.Y.), vol. 220, pp. 671-680, May 1983.
Knill et al., "The Bayesian brain: the role of uncertainty in neural coding and computation," Trends in Neurosciences, vol. 27, pp. 712-719, Dec. 2004.
Lecun et al., "Deep learning," Nature, vol. 521, pp. 436-444, May 2015.
Lin et al., "All-Optical Machine Learning Using Diffractive Deep Neural Networks," Apr. 2018. 20 pages.
Macready et al., "Criticality and Parallelism in Combinatorial Optimization," Science, vol. 271, pp. 56-59, Jan. 1996.
McMahon et al., "A fully programmable 100-spin coherent Ising machine with all-to-all connections.," Science (New York, N.Y.), vol. 354, pp. 614-617, Nov. 2016.
Mead, "Neuromorphic electronic systems," Proceedings of the IEEE 78, 1629-1636 (1990).
Onsager, "Crystal Statistics. I. A Two-Dimensional Model with an Order-Disorder Transition," Physical Review, vol. 65, pp. 117-149, Feb. 1944.
Pelissetto et al., "Critical phenomena and renormalization-group theory," Physics Reports, vol. 368, pp. 549-727, Oct. 2002.
Peretto, "Collective properties of neural networks: A statistical physics approach," Biological Cybernetics, vol. 50, pp. 51-62, Feb. 1984.
Reck et al., "Experimental realization of any discrete unitary operator," Phys. Rev. Lett. 73, 58-61 (1994).
Rendl et al., "Solving Max-Cut to optimality by intersecting semidefinite and polyhedral relaxations," Mathematical Programming, vol. 121, pp. 307-335, Feb. 2010.
Saade et al., "Random projections through multiple optical scattering: Approximating Kernels at the speed of light," in 2016 IEEE International Conference on Acoustics, Speech and Signal Processing (ICASSP), pp. 6215-6219, IEEE, Mar. 2016.
Schirmer et al., "Nonlinear mirror based on two-photon absorption," Journal of the Optical Society of America B, vol. 14, p. 2865, Nov. 1997. 4 pages.
Selden, "Pulse transmission through a saturable absorber," British Journal of Applied Physics 18, 743 (1967). 7 pages.
Shen et al., "Deep learning with coherent nanophotonic circuits," Nature Photonics. Jun. 2017. 7 pages.
Soljacic et al., "Optimal bistable switching in nonlinear photonic crystals," Physical Review E, vol. 66, p. 055601, Nov. 2002. 4 pages.
Tait et al., "Broadcast and weight: An integrated network for scalable photonic spike processing," Journal of Lightwave Technology, vol. 32, No. 21, pp. 3427-3439, 2014.
Tait et al., "Photonic Neuromorphic Signal Processing and Computing," pp. 183-222, Springer, Berlin, Heidelberg, 2014.
Vandoorne et al., "Experimental demonstration of reservoir computing on a silicon photonics chip," Nature Communications, vol. 5, p. 3541, Dec. 2014.
Vazquez et al., "Optical NP problem solver on laser-written waveguide plat-form," Optics Express, vol. 26, p. 702, Jan. 2018. 9 pages.
Vivien et al., "Zero-bias 40gbit/s germanium waveguide photodetector on silicon," Opt. Express 20, 1096-1101 (2012).
W. A. Little, "The existence of persistent states in the brain," Mathematical Biosciences, vol. 19, No. 1-2, 1974. 20 pages.
Wang et al., "Coherent (sing machine based on degenerate optical parametric oscillators," Physical Review A, vol. 88, p. 063853, Dec. 2013. 9 pages.
Wu et al., "An optical fiber network oracle for NP-complete problems," Light: Science & Applications, vol. 3, pp. e147-e147, Feb. 2014.

\* cited by examiner

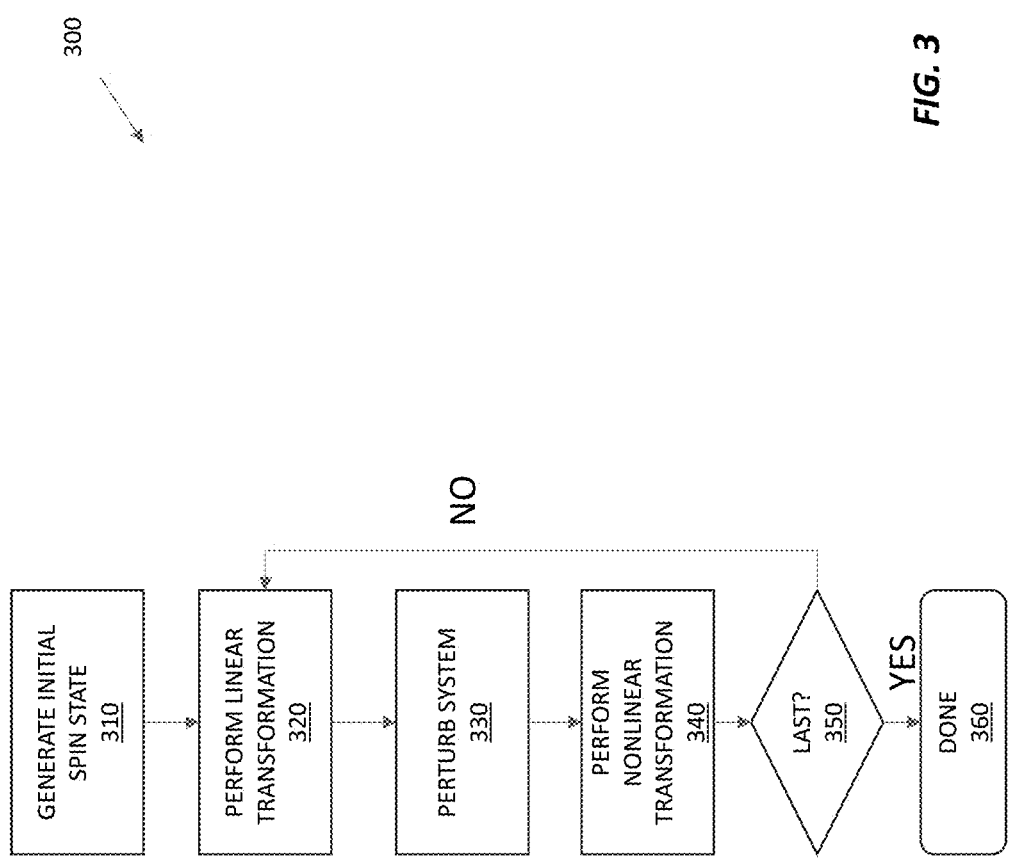

OPTICAL ISING MACHINES AND OPTICAL CONVOLUTIONAL NEURAL NETWORKS

CROSS-REFERENCE TO RELATED APPLICATION(S)

This application claims the priority benefit, under 35 U.S.C. § 119(e), of U.S. Application No. 62/531,217, entitled "Optical Ising Machine and Optical Convolutional Neural Networks," which was filed on Jul. 11, 2017, and is incorporated herein by reference in its entirety.

GOVERNMENT SUPPORT

This invention was made with Government support under Grant No. W911NF-13-D-0001 awarded by the Army Research Office. The Government has certain rights in the invention.

BACKGROUND

Combinatorial optimization problems arise in many areas, including physics, chemistry, logistics, electronics, and finance. Today, many of these problems are solved (or attempted to be solved) using stochastic processes, such as Monte Carlo methods, implemented using electronic processors. Some stochastic techniques, such as simulated annealing, can find approximate solutions of non-deterministic polynomial-time (NP) hard problems in which the number of potential solutions diverges exponentially.

The Ising problem is one type of NP-hard problem. It involves find the ground state of the Ising model, which describes behavior in which individual elements in a physical system modify their behavior to conform to the behavior of nearby elements. The Ising model was originally proposed to explain observations about ferromagnetic materials. Since then, it has been used to model phase separation in binary alloys and spin glasses as well as neural networks, flocking birds, and beating heart cells.

In the Ising model, the elements can be represented by a set of spins $\sigma_j = \pm 1$. For an Ising model with N elements, the Hamiltonian is:

$$H^{(K)} = -\tfrac{1}{2}\Sigma_{1 \leq i,j \leq N} K_{ij}\sigma_i\sigma_j,$$

where K is an N×N real symmetric matrix with $K_{ii}=0$. K is known a priori; its values describe the couplings or relationships between different pairs of elements in the Ising model, which is why its diagonal values are zero ($K_{ii}=0$). For an Ising model of a ferromagnetic system, K represents the couplings between different ferromagnetic elements. For a neural network, K is a weight matrix that represents the couplings between neurons. The Ising problem is solving for the spin distribution that minimizes the Hamiltonian for a given K—in other words, finding the ground state for a given set of couplings between the Ising model's elements. From the perspective of optimization, finding the spin distribution that minimizes this Hamiltonian (i.e., finding the ground state of the Ising model) for an arbitrary matrix K is an NP-hard problem.

SUMMARY

The inventors have recognized that the Ising problem can be solved (or attempted to be solved) using photonic processors. These photonic processors take advantage of the benefits of performing computations in the optical domain over the electronic domain. These benefits include the ability to perform many high-speed computations in parallel with very little energy expenditure. For example, a photonic processor can perform thousands of parallel computations in the time it takes light to propagate from the photonic processor's input to the photonic processor's output—a time that can be on the order of nanoseconds. These properties of photonic processors make them especially attractive for solving the Ising problem and other NP-hard problems.

Embodiments of the present technology include methods of determining a ground state of an Ising model. An example method includes, at each of a plurality of time steps: encoding optical signals with amplitudes representing an initial spin state of the Ising model; linearly transforming the optical signals to yield linearly transformed optical signals; perturbing the linearly transformed optical signals to yield perturbed signals; nonlinearly thresholding the perturbed optical signals to yield nonlinearly thresholded signals; and determining the ground state for the Ising model from the plurality of nonlinearly thresholded signals.

Encoding the optical signals may include splitting a pulse from a pulsed laser into N optical signals, where N is a positive integer. The amplitudes of the N optical signals are then modulated to represent the initial spin state. The optical signals may be transmitted synchronously to a linear transformation unit that performs the linear transformation.

Linearly transforming the optical signals may comprise performing a static linear transformation at each time step in the plurality of time steps. The Ising model can be represented by a Hamiltonian:

$$H^{(K)} = -\Sigma_{1 \leq i,j \leq N} K_{ij}S_iS_j + \tfrac{1}{2}\Sigma_{1 \leq i,j \leq N} K_{ij},$$

where K is a coupling matrix representing interactions between elements of the Ising model and $S_j$ represents a spin of a $j^{th}$ element of the Ising model, in which case linearly transforming the optical signals comprises performing a matrix multiplication with a matrix J based on the coupling matrix K. J can be equal to the square root of $\tilde{K}$, which is a sum of K and a diagonal matrix $\Delta$.

If desired, the nonlinearly thresholded signals from a first time step can be fed back into the optical signals in a second time step. And if desired, a portion of each nonlinearly thresholded signal can be detected, e.g., for monitoring purposes.

Other embodiments include a photonic processor for determining a spin distribution of a ground state of an Ising model. The photonic processor includes a light source, a matrix multiplication unit in photonic communication with the light source, a perturbation unit operably coupled to the matrix multiplication unit, and a nonlinear thresholding unit operably coupled to the perturbation unit. In operation, the light source generates optical signals with amplitudes representing an initial spin state of the Ising model. The matrix multiplication unit linearly transforms the optical signals into linearly transformed optical signals. The perturbation unit perturbs the linearly transformed optical signals, e.g., by adding noise during photodetection or applying random optical phase variations, to generate perturbed signals. And the nonlinear thresholding unit nonlinearly thresholds the perturbed signals to yield nonlinearly thresholded signals that represent a spin distribution of the ground state of the Ising model.

In some cases, the photonic processor may include optical waveguides, in photonic communication with the matrix multiplication unit and the nonlinear thresholding unit, to feed the nonlinearly thresholded signals back into an input of the matrix multiplication unit. And the perturbation unit may include photodetector(s) to detect and perturb the plurality of linearly transformed optical signals via measurement noise.

Other embodiments include optical convolutional neural network (CNN) processors. An example optical CNN processor comprises a substrate, a first optical interference unit integrated onto the substrate, a optical delay lines integrated onto the substrate in photonic communication with the first optical interference unit, and a second optical interference unit integrated onto the substrate in photonic communication with the optical delay lines. The first optical interference unit may represent a first layer in a convolutional neural network and the second optical interference unit may represent a second layer in the convolutional neural network.

In operation, the first optical interference unit performs a first matrix multiplication on a first plurality of optical signals at a first time step and performs a second matrix multiplication on a second plurality of optical signals at a second time step after the first time step. The optical delay lines produce a delayed copy of the first plurality of optical signals. And the second optical interference unit performs a third matrix multiplication on the second plurality of optical signals and the delayed copy of the first plurality of optical signals.

The optical processor can also include modulators, in photonic communication with the first optical interference unit, to modulate the first plurality of optical signals with an array of input values. These modulators may be driven by digital logic that parses digital values representing an image into a plurality of arrays of input values. And the optical processor may also include photodetectors, integrated onto the substrate, to detect an output of the optical processor.

All combinations of the foregoing concepts and additional concepts discussed in greater detail below (provided such concepts are not mutually inconsistent) are part of the inventive subject matter disclosed herein. All combinations of claimed subject matter appearing at the end of this disclosure are part of the inventive subject matter disclosed herein. The terminology used herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3 is a flow chart that illustrates one process for solving the Ising problem using a photonic processor.

Figures 6A, 6B:
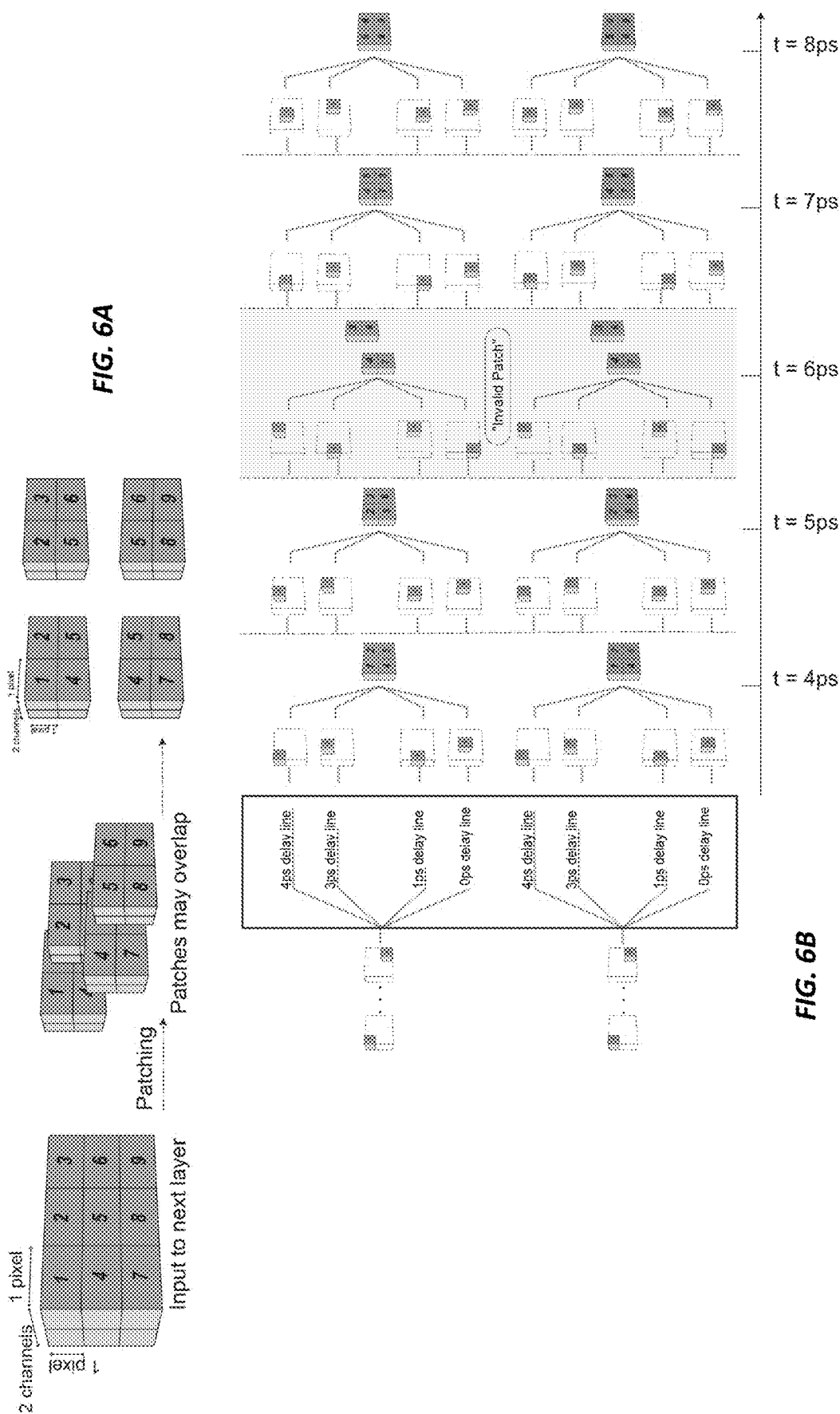
FIG. 6A illustrates patching the time series produced in FIG. 5B as data cubes labeled with the timestep that the corresponding kernel dot product was computed.
Figure 7:
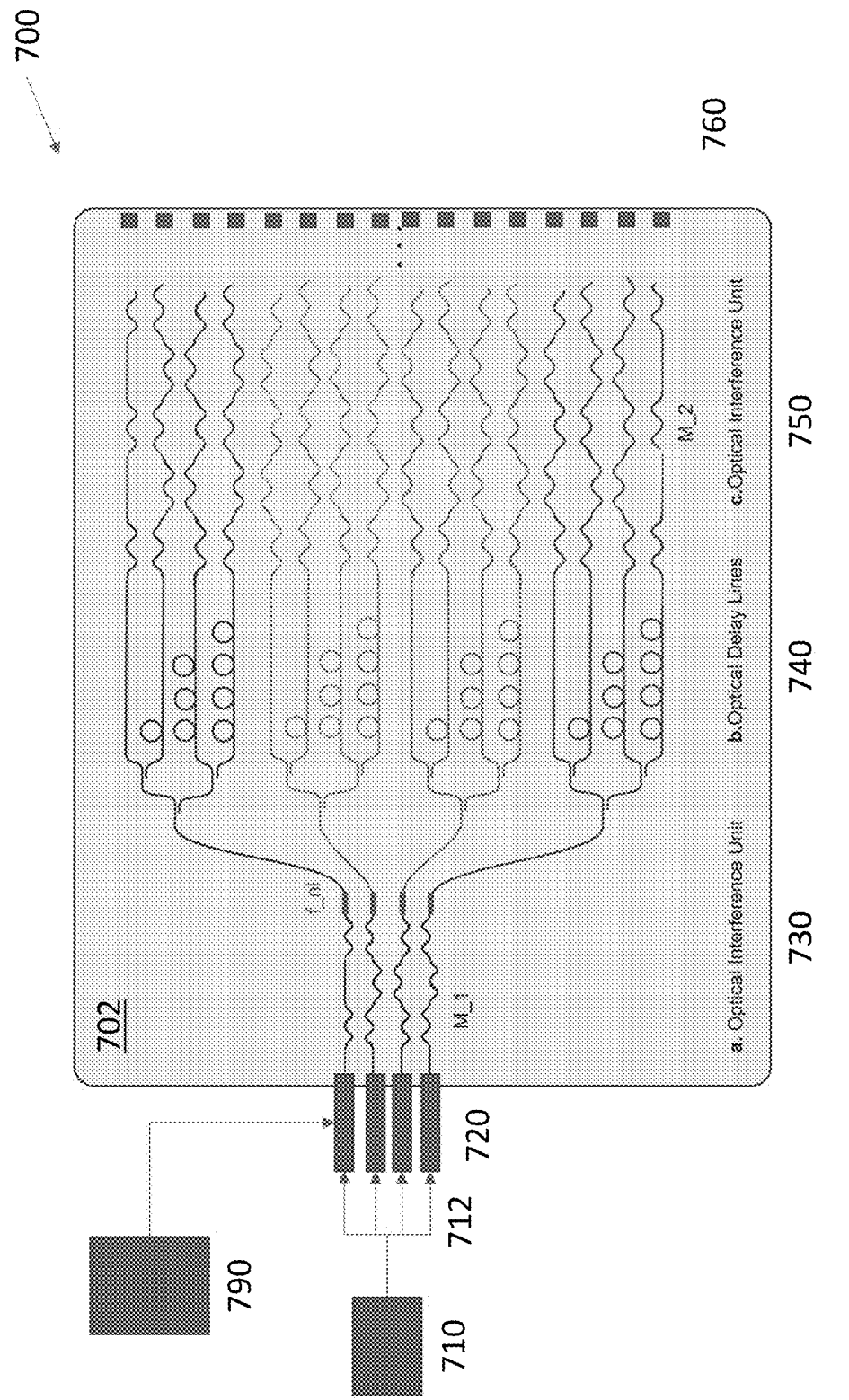

FIG. 6B illustrates a data reshuffling and re-patching procedure for converting the set of kernel dot products at the output of a neural network layer (left hand-side) into input patches the same size as the kernels for the next neural network layer FIG. 7 illustrates part of a convolutional neural network with a first optical interference unit for implementing a first kernel matrix M1 (left), optical delay lines for reforming the sequence of kernel dot products into new patches for input into a second kernel matrix M2 (middle), and a second optical interference unit to implement the second kernel matrix M3 (right; partially depicted here).

DETAILED DESCRIPTION

Optical Ising Machines

An optical Ising Machine is a photonic processor that computes a probabilistic solution to an Ising problem. In other words, it finds the spin distribution that minimizes the Hamiltonian for a given K in the equation above. This Hamiltonian can also be expressed as:

$$H^{(K)} = -\Sigma_{1 \leq i,j \leq N} K_{ij} S_i S_j + \frac{1}{2} \Sigma_{1 \leq i,j \leq N} K_{ij},$$

where $S_j$ represents the spin of the $j^{th}$ element and has a value of 0 or 1. This representation is amenable to optical computation because the spins are real and positive, which means that they can be represented by optical beams of different amplitudes.

To solve the Ising problem for a given K, the optical Ising Machine generates a set of optical beams whose amplitudes encode the input spin distribution. These beams propagate through a static matrix multiplication unit or linear transformation unit that multiplies an input spin distribution by a static matrix. This static matrix is given by J, where J is equal to the square root of $\tilde{K}$, which is the sum of K and a diagonal matrix $\Delta$. Adding this diagonal matrix to K ensures that J, which is the square root of this sum, is real-valued instead of potentially complex-valued. (The diagonal matrix $\Delta$ is selected to ensure that J is real-valued for a given K.)

The output of the matrix multiplication unit is perturbed, e.g., adding random amplitude noise or phase shift at each time step, subject to a nonlinear transformation. This perturbation reduces the autocorrelation times by preventing the spin state from getting caught in a solution that yields a local minimum of the Hamiltonian instead of the global minimum. The result is fed back into the input of the matrix multiplication unit at the next time step. This continues for as many time steps as desired. The number of time steps may be set ahead of time or determined by looking at convergence of the output. The photonic processor's output(s) at the end of the last time step represent its solution to the Ising problem for the Ising model represented by the $\tilde{K}$. Because the two matrices differ by a constant, their corresponding Hamiltonians are minimized by the same spin distribution.

FIG. 1A shows a photonic processor 100 that can compute the ground state of an Ising model. In other words, this photonic processor 100 is an optical Ising Machine that produces a probabilistic solution to the Ising problem as described above. It can be implemented in or on a semiconductor substrate and includes one or more light sources 110 coupled to a matrix multiplication unit 120, whose outputs are coupled in turn to a nonlinearity thresholding unit 130. The beams emitted by the nonlinearity thresholding unit 130 propagate through a first set of beam splitters 132, which direct portions of the beams to a continuous output reader 160, and a second set of beam splitters 134, which couple portions of the beams back to the waveguides 112 feeding the matrix multiplication unit 120. A dot product unit 140 receives the portions of the beams that propagate through the beam splitters 132 and 134. A photodetector 150 coupled to the output of the dot product unit 140 detects the optical output of the photonic processor 100 into an electronic signal representing the spin distribution that minimizes the Hamiltonian of the Ising model. Each of these components can be integrated in or on the semiconductor substrate.

In operation, the light sources 110 emit beams whose amplitudes represent the spin states of the elements of the Ising model. The light sources 110 emit these beams synchronously—i.e., at the same time—so the beams propagate in parallel through the photonic processor 100. The light sources 110 can be implemented as a single pulsed laser whose output is split N ways, with each output modulated by a corresponding amplitude modulator. It can also be implemented as a set of phase-coherent, temporally synchronized pulsed lasers, each of which is pulsed or amplitude-modulated based on the desired spin state distribution.

Waveguides 112 guide the beams from the light sources 110 to the matrix multiplication unit 120. As noted above, these waveguides 112 may be formed in or on a semiconductor substrate. The matrix multiplication unit 120 can also be implemented as a set of interconnected Mach-Zehnder interferometers (MZIs) or ring resonators integrated onto the semiconductor substrate. In bulk optics, it can be implemented as a hologram or spatial light modulator (SLM) between a pair of lenses.

In any implementation, the matrix multiplication unit 120 performs a static linear transformation on the input beams. As explained above, the linear transformation is related to the coupling matrix K in the Hamiltonian that describes the system represented by the Ising model. More specifically, the linear transformation is a matrix multiplication of the input spin distribution by J, where $J^2=\tilde{K}$ and $\tilde{K}=K+\Delta$, where J is a real-valued matrix and $\Delta$ is a diagonal offset matrix selected to ensure that J is a real-valued matrix. This linear transformation is static—it is the same at each time step/iteration—so the matrix multiplication unit 120 can be completely passive. Theoretically, this means that performing the linear transformation can consume no power. (In reality, however, there may be losses due to absorption, scattering, and imperfect coupling.)

The nonlinear thresholding unit 130 applies a nonlinear threshold to the linearly transformed outputs of the matrix multiplication unit. The threshold is a linear combination of the coupling matrix K: it is equal to the sum of the matrix elements divided by two. For more, see, e.g., Equation (19) in P. Peretto, "Collective properties of neural networks: a statistical physics approach," Biological Cybernetics, 50(1): 51-62, 1984, which is incorporated herein by reference. The nonlinear thresholding operation is a nonlinear transformation that, like the linear transformation, is the same through every iteration. It can be performed in the optical domain as a set of saturable absorbers, such as (doped) semiconductors, monolayer graphene, or nonlinear mirrors. Or it can be performed in the electronic domain after the optical signals have been transduced by one or more photodetectors.

Some beam splitters 132 couple fractions of the thresholded signals back to the input of the matrix multiplication unit 120 via waveguides 170, where they add coherently with the inputs to the next time step/iteration. If the beam splitters 132 feed back less than 100% of the energy, the beams may be amplified; if close to 100% of the power is fed back, then the signal isn't detected until the last iteration. In other words, the processor 100 performs n iterations, where n is a large number, and feeds back 100% of the energy with each iteration. At the end of the last iteration, the processor 100 measures the signal. In either case, the feedback loop is synchronized with the pulse repetition rate of the light source 110 to ensure that the beams interfere with each other.

Other beam splitters 134 couple fractions of the thresholded signals to a continuous output reader 160, which can be implemented as a linear photodetector array. The continuous output reader 160 monitors the beams' current energy state and is optional, as are the beam splitters 134. The untapped portions of the thresholded signals propagate to a dot product unit 140, which takes the dot product of the inputs. Because the dot product is a linear operation, it can be implemented optically, e.g., with a lens-spatial light modulator (SLM)-lens system to first perform a matrix multiplication and then use an SLM to do the final dot product, with the output detected by a photodetector 150. It can also be computed in the electronic domain, after the thresholded signals have been detected by photodetectors in an array.

Detection perturbs the optical signals by adding noise in the form of shot noise, thermal noise, or both. In addition, vibrations and temperature drift may change the relative optical path lengths experienced by the signals as they propagate through the processor 100, causing random phase perturbations, which in turn cause random fluctuations in the optical outputs. These perturbations, whether from shot noise, thermal noise, or phase perturbations, set the level of entropy probed in the distribution probed by the photonic processor. Increasing the noise from zero reduces how long it takes the processor 100 to converge to a solution. Not enough noise may cause the processor 100 to get stuck in a local minimum of the Hamiltonian, whereas too much noise also degrades performance.

Figure 2:
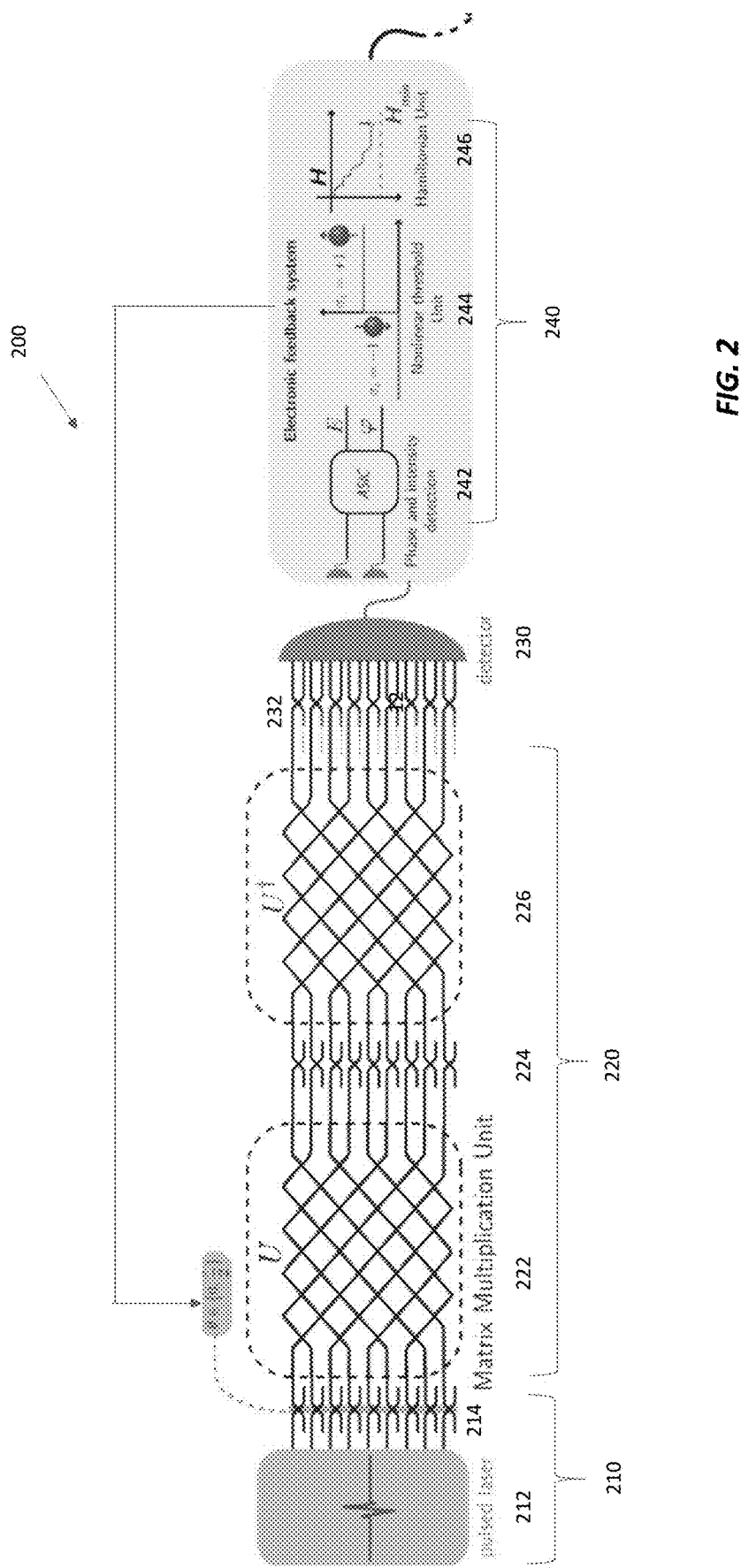
FIG. 2 shows a physical realization of a photonic processor that computes a probabilistic solution to the Ising problem.

FIG. 2 shows an integrated optical photonic processor 200 for computing the solution to the Ising problem. This photonic processor 200 performs linear operations in the photonic domain and nonlinear operations in the electronic domain. It includes a light source 210 with a pulsed laser 212 and an array of N programmable 2×2 beam splitters 214, where N is the number of elements represented by the Ising model. The laser's output is split N ways and fed into the beam splitter array 214. This pulsed laser 212 (and the processor 200) may operate at a Gigahertz repetition rate. One output from each beam splitter 214 is coupled to a corresponding input of a matrix multiplication unit 220. The other output is terminated. The beam splitters 214 are switched with phases of 0 or $\pi/2$ to produce either beams at the outputs coupled to the matrix multiplication unit 220 with amplitudes of "1" or "0" depending on the input spin distribution.

The matrix multiplication unit 220 includes two arrays of interconnected Mach-Zehnder interferometers (MZIs) 222 and 226 connected by a one-dimensional array of beam splitters 224. The first MZI array 222 multiplies the input by a matrix U and the second MZI array 226 multiplies the output of the first MZI array 222 by a matrix $U^\dagger$, where $K=UDU^\dagger$. The beam splitters 224 perform the diagonal matrix multiplication, dumping some of the signal to modulate the intensity. These arrays and their interconnections can be implemented as waveguides and couplers in a semiconductor substrate.

Each of the matrix multiplication unit's outputs is coupled to an input of a corresponding 50/50 beam splitter 232. The beam splitters' outputs illuminate correspond pairs of detector elements in a detector array 230 in a balanced homodyne detection scheme. The detector array 230 is coupled to an electronic feedback system 240 that can be implemented in analog/digital electronics. The electronic feedback system 240 includes a phase and intensity detection module 242 that determines the phase and intensity of each beam, a nonlinear threshold unit 244 that imparts a nonlinear threshold function on the detected signals, and a Hamiltonian unit 246 that computes the value of the Hamiltonian given the spin states represented by the thresholded values. The nonlinear threshold function is based on the linear transformation matrix as described above with respect to the nonlinear thresholding unit in FIG. 1. And the Hamiltonian unit 246 monitors the energy at the output. The output of the electronic feedback unit 240 is fed back as a control signal for the beam splitters 214 that control the amplitudes of the inputs to the matrix multiplication unit 220.

Figure 1:
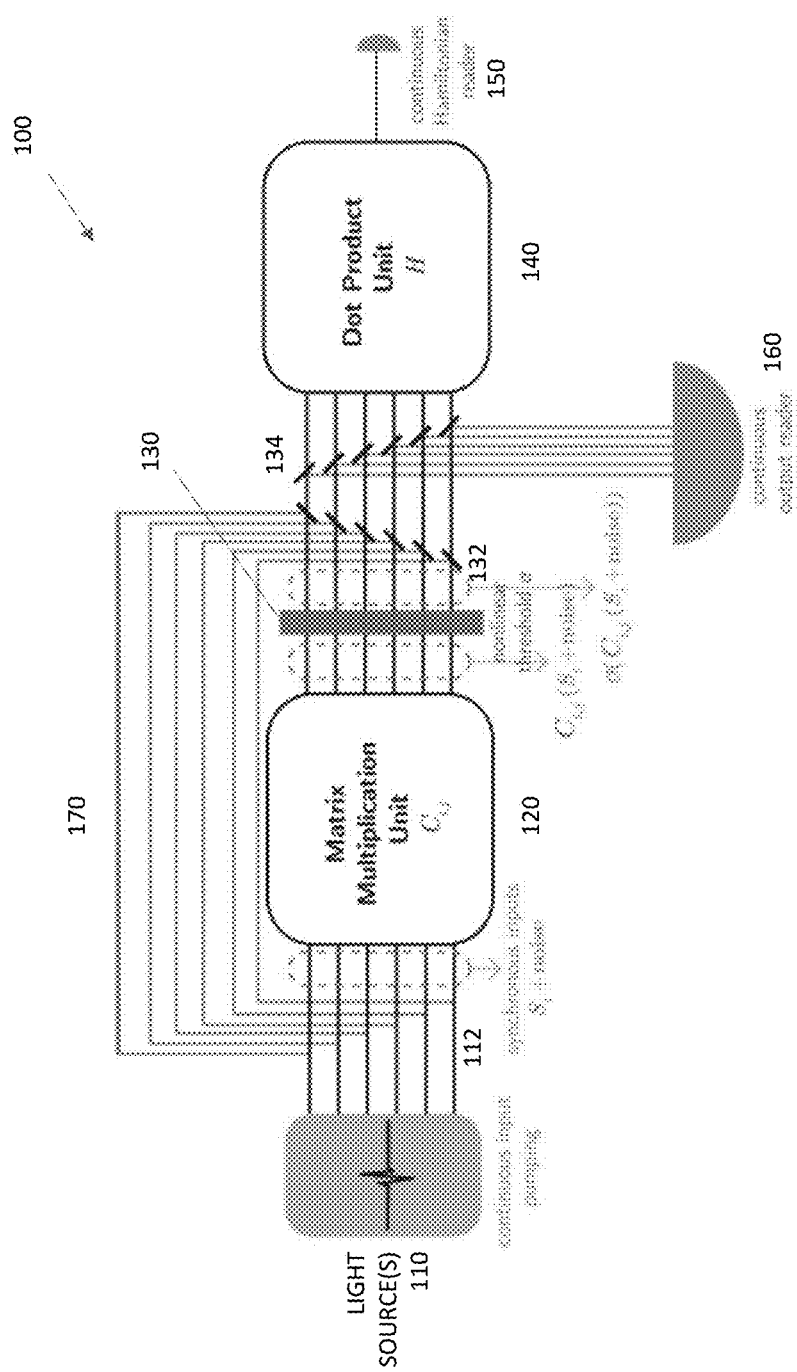
FIG. 1 shows a schematic of a photonic processor that computes a probabilistic solution to the Ising problem.

FIG. 3 shows a process 300 for solving an Ising problem using an optical Ising machine like those shown in FIGS. 1 and 2. The process 300 includes generating a set of optical pulses or other optical signals whose amplitudes represent the initial spin states of the Ising model (step 310). These signals are linearly transformed through a static matrix multiplication with a static matrix based on the coupling matrix of the Hamiltonian of the Ising model (step 320) and perturbed (step 330). The signals are then nonlinearly transformed by nonlinear thresholding also based on the coupling matrix of the Hamiltonian of the Ising model (step 340). Steps 330 and 340 can occur in the optical domain or the electronic domain. For instance, perturbations can be applied as random optical phase fluctuations or as detector noise. And thresholding can be applied with a saturable absorber or in electronics. The outputs are fed back into the inputs if the process 300 hasn't reached the last iteration (step 350); otherwise the process ends (step 360).

Optical Convolutional Neural Networks

A photonic processor can also be used to implement an artificial neural network. Electronically implement artificial neural networks have dramatically improved performance for many machine learning tasks. A fully optical neural network like those disclosed here could be at least two orders of magnitude faster and three orders of magnitude more power efficient than state-of-the-art electronic implementations of artificial neural networks.

A computer that can learn, combine, and analyze vast amounts of information quickly, efficiently, and without the need for explicit instructions is a powerful tool for handling large datasets. Indeed, "deep learning" processes have received an explosion of interest in both academia and industry for their utility in image recognition, language translation, decision making problems, and more. Traditional central processing units (CPUs) are far suboptimal for implementing these algorithms. Possibly as a result, a growing effort in academia and industry has been put towards the development of new hardware architectures tailored towards applications in artificial neural networks and deep learning.

Graphical Processing Unit (GPUs), Application Specific Integrated Circuits (ASICs) and field-programmable gate arrays (FPGAs), have enabled both energy efficiency and speed enhancements for learning tasks. In parallel, hybrid optical-electronic systems that implement spike processing and reservoir computing have been shown. However, the computational speed and power efficiency achieved with these hardware architectures are still limited by electronic clock rates and Ohmic losses.

Fully optical neural networks offer a promising alternative approach to microelectronic and hybrid optical-electronic implementations. In fact, artificial neural networks are a promising fully optical computing paradigm for at least three reasons. First, they use fixed matrix multiplications, which are linear transformations (and certain non-linear transformations) that can be performed at the speed of light and detected at rates exceeding 100 GHz in photonic networks and, in some cases, with minimal power consumption. Second, they have weak requirements on nonlinearities, which means that many optical nonlinearities can be used to implement nonlinear operations in an optical neural network. And third, once a neural network is trained, the architecture can be passive, which means the computation on the optical signals is performed without additional energy input.

An artificial neural network architecture contains an input layer, at least one hidden layer, and an output layer. In each layer, information propagates through the neural network via a linear combination (e.g., a matrix multiplication) followed by a nonlinear activation function applied to the result from linear combination. In training an artificial neural network model, data are fed into the input layer, and the output is calculated through a series of forward propagation steps. Then the parameters are optimized through back-propagation.

An artificial neural network can be implemented optically as a combination of three optical processing units and various other components, including at least one light source to supply the optical signals and at least one detector to convert the optical outputs into electronic signals. The optical processing units include an optical interference unit, an optical amplification unit, and an optical nonlinearity unit. With these three units, in principle, an optical neural network can perform computations in a way that is mathematically equivalent to the way that a traditional artificial neural network performs computations.

The optical interference unit performs an arbitrary unitary matrix multiplication on the input optical signal, e.g., using a network of Mach-Zehnder interferometers. (Mathematically, it can be rigorously proved that any arbitrary unitary matrix can be represented by the network of Mach-Zehnder interferometers.) The optical amplification unit generalizes the unitary matrix to an arbitrary matrix operation. In general, any arbitrary matrix can be generated using optical interference and linear amplification through singular value decomposition (SVD). The optical nonlinearity unit applies the nonlinear activation function. Many materials respond to external light signals in a nonlinear way with respect to light intensity. One common optical nonlinearity is saturable absorption.

One type of artificial neural network is a convolutional neural network (CNN), which tend to be specialized in representing image classifications. Like other artificial neural networks, a CNN has a series of interconnected layers and learns the weights and biases of each layer in the training process. And like optical implementations of other artificial neural networks, optical implementations of CNNs tend to be very fast and consume relatively little power.

A typical CNN architecture includes an input layer, a convolution layer, a rectified linear unit (RELU) layer, a pooling layer, and a fully connected (FC) layer. The input layer holds a color image represented by a matrix whose dimensions are W×H×3, where W and H are the width and height, respectively, in pixels and there are three color channels (e.g., red, green, and blue). The convolution layer computes the dot product of K filters and the input, yielding an array whose dimensions are W×H×K. The RELU layers applies an elementwise activation function that doesn't change the volume of the matrix. The pooling layer performs a down-sampling operation along the width and height dimensions of the matrix, resulting in an array of dimensions W/2"×H/2"×K. The matrix dimensionality can also be reduced by occasionally taking larger strides in the convolution layer, eliminating or reducing the number of pooling layers. The FC layer computes the class scores, yielding an array of dimensions 1×1×C, where C is the number of classes available for the CNN to classify the input image. Any FC layer can be converted to a convolution layer and vice versa.

The convolution layers in a CNN can be implemented using matrix multiplication as follows. First, the 3D input array is converted into a 2D input matrix, with each "patch" in the 3D input array mapped to a row in the 2D input matrix. Next, the filter kernels are "unrolled" in 1D columns, which are arranged side-by-side to form a 2D filter matrix. Multiplying the 2D input matrix and the 2D filter matrix is equivalent to a convolution of the 3D input array with the filter kernels. This can process can be implemented optically as explained below.

Figure 4A:
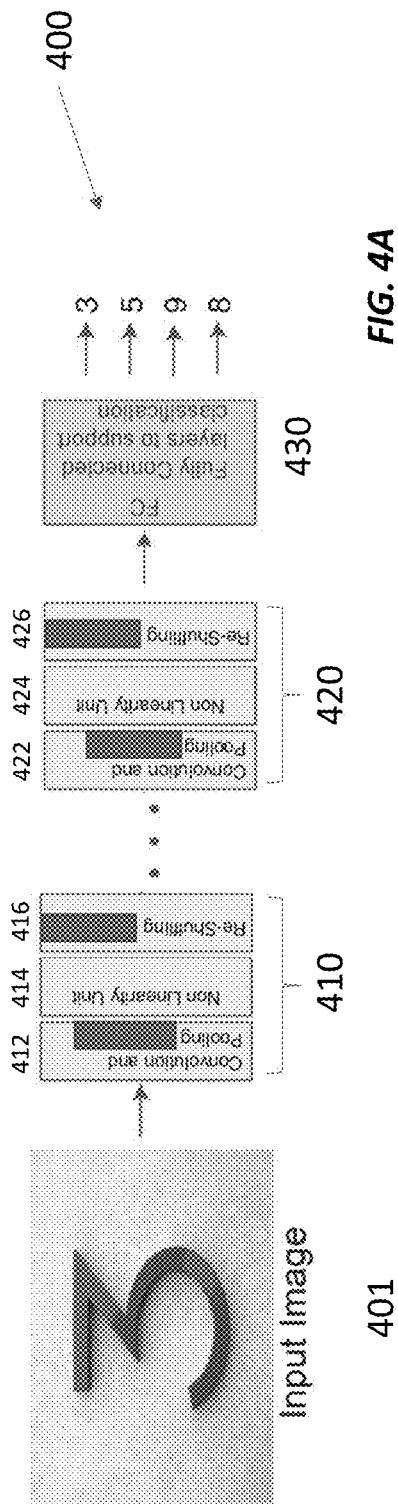
FIG. 4A illustrates a process for implementing a convolutional neural network for recognizing an image (here, an image of the number "3").
Figure 4B:
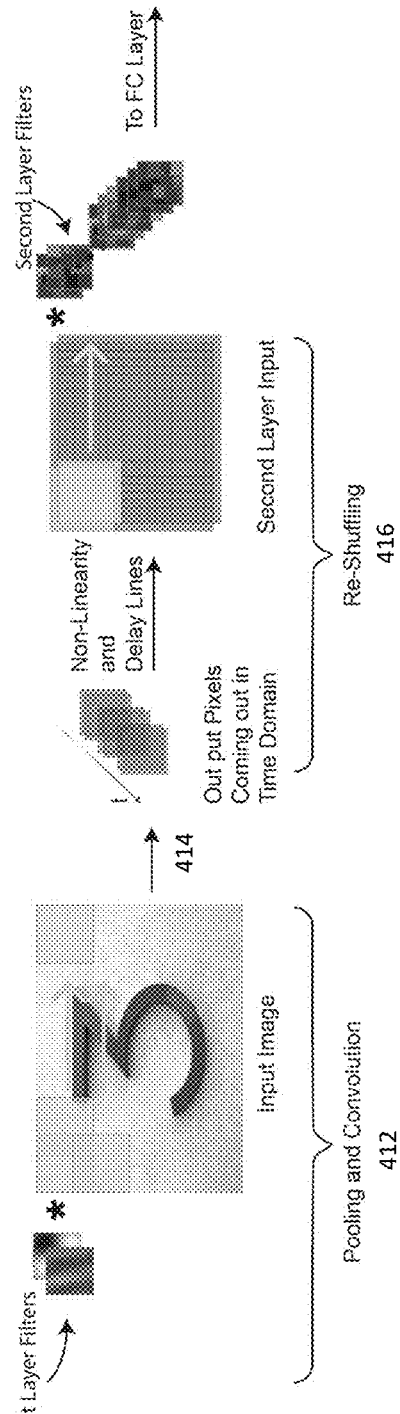
FIG. 4B illustrates the pooling and convolution sub-process and re-shuffling process of FIG. 4A.

FIGS. 4A and 4B show how a CNN recognizes a number (here, the number "3") or other feature in an input image 401. FIG. 4A shows a process 400 by which the input image 401 propagates through the CNN. The input image 400 propagates through a series of stages, with two stages 410 and 420 shown in FIG. 4A. Each stage 410, 420 includes a convolution and pooling layer 412, 422, a nonlinearity unit 414, 424, and a re-shuffling layer 416, 426, shown in great detail in FIG. 4B. The last stage 420 is connected to an FC layer 430, which produces scores representing the likelihood that the input image 401 falls into one of the classes on which the CNN was trained.

Figure 5A:
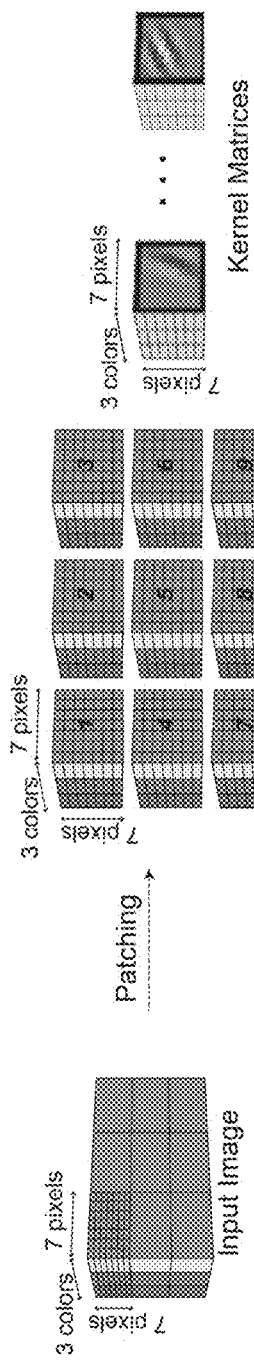
FIG. 5A illustrates how pixels from an input image (left) are grouped into smaller patches, which have the same dimension as the kernels of the first layer (depicted on the right-hand side), for general optical matrix multiplication.
Figure 5B:
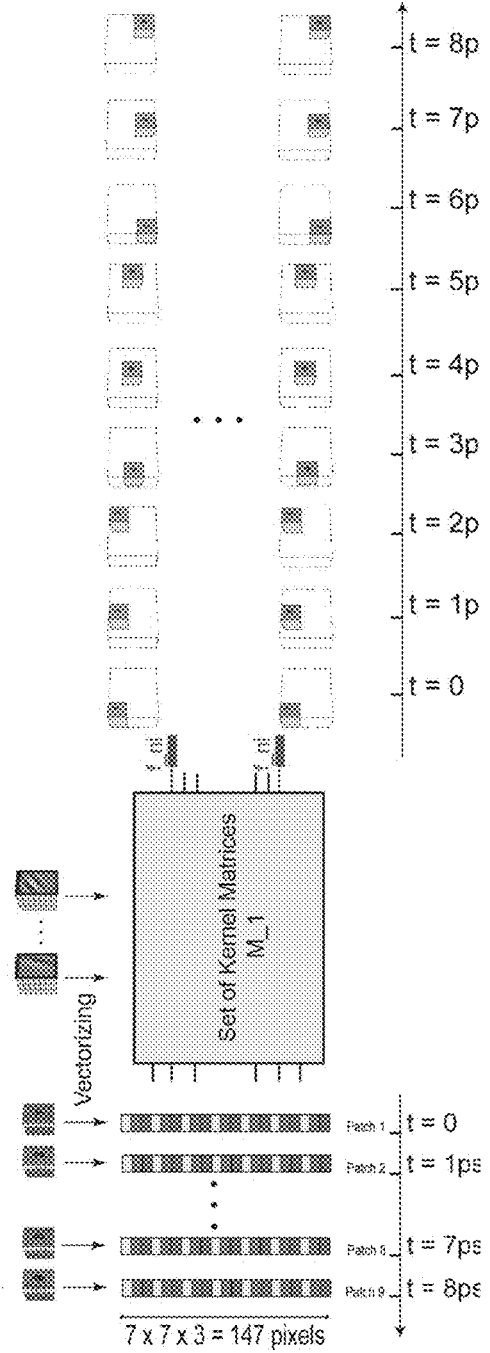
FIG. 5B illustrates computing kernel dots products for the first layer of a neural network by reshaping the smaller patches of FIG. 5A reshaped into a single column of data (a patch input vector) that is fed, patch by patch, into the optical interference unit to yield a time series representing dot product of the first layer kernels with the patch input vector.

FIGS. 5A and 5B show the patching process used for the optical matrix multiplication by each of the convolution layers in the CNN. In FIG. 5A, the pixels of the input image on the left (here, each 21×21×3 colors) are grouped into smaller patches, which have the same dimension as the kernels of the first convolution layer (depicted on the right-hand side of FIG. 5A). In FIG. 5B, each patch is reshaped into a single column of data. These columns of data are fed sequentially, patch by patch, into the optical interference unit. Propagation of the optical data column through the optical interference unit implements a dot product of the first layer kernels with the patch input vector. The result is a time series of optical signals whose amplitudes are proportional to the dot products of the patches with the kernels. Each output port of the optical interference unit provides a separate time series of dot products associated with a given kernel.

FIG. 6A illustrates patching the time series produced in FIG. 5B as data cubes labeled with the timestep that the corresponding kernel dot product was computed, e.g., using optical delay lines. In other words, the output kernel dot products from the first layer in FIG. 4B are depicted as cubes on the left in FIG. 5A. Each cube is labeled with the timestep the corresponding kernel dot product was computed.

FIG. 6B illustrates a data reshuffling and re-patching procedure for converting the set of kernel dot products at the output of a neural network layer (left hand-side) into input patches the same size as the kernels for the next neural network layer. The optical delay lines are designed such that a sequence of kernel dot products can be reshuffled in time to form a new patch the same size as the next layer's kernels. The reshuffling procedure produces valid patches only at specific sampling times. The grayed-out section at t=6 ps indicates an invalid sampling interval.

FIG. 7 shows an optical CNN implementation 700 with two optical interference units 730 and 750 connected by optical delay lines 740. This CNN implementation can be integrated onto a semiconductor substrate 702, as can each of the components (waveguides, beam splitters, photodetectors, etc.). The first optical interference unit 730 is used to implement a kernel matrix M1. The thicker segments at the output of the kernel matrix M1 represent an optical nonlinearity (e.g., to provide the nonlinearity unit 414 of FIG. 4A). b. The optical delay lines 740 properly reform the sequence of kernel dot products into new patches for input into a second kernel matrix M2. The second optical interference unit 750 implements the second kernel matrix M2 (partially depicted here). For clarity the actual number of inputs and outputs have been reduced and the attenuator stage and subsequent additional optical interference units have been omitted from FIG. 7.

The optical signals that propagate through the optical interference units and optical delay lines can be generated with a laser 710 that is connected via a beam splitter 712 and waveguides to a set of electro-optic modulators 720, each of which is modulated with digital logic 790 that parses the input data (e.g., an input image) into patches. (The laser 710 can be an on-chip laser or an off-chip laser coupled to the chip via an optical fiber.) The optical signals can be generated by connecting the laser 710 to any of the input (left-hand) ports of the first optical interference unit 730, and the Mach-Zehnder interferometer (MZI) arrays encode the data onto the optical signal(s). On-chip photodetectors 760 coupled to the outputs of the last optical interference unit sense the optical signals after they have propagated all the way through the optical interference units and optical delay lines.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A photonic processor for determining a spin distribution of a ground state of an Ising model, the photonic processor comprising:
  a light source to generate a plurality of optical signals with amplitudes representing an initial spin state of the Ising model;
  a matrix multiplication unit, in photonic communication with the light source, to linearly transform the plurality of optical signals into a plurality of linearly transformed optical signals;
  a perturbation unit, operably coupled to the matrix multiplication unit, to perturb the plurality of linearly transformed optical signals to yield a plurality of perturbed signals; and
  a nonlinear thresholding unit, operably coupled to the perturbation unit, to nonlinearly threshold the plurality of perturbed signals to yield a plurality of nonlinearly thresholded signals, the plurality of nonlinearly thresholded signals representing a spin distribution of the ground state of the Ising model.

2. The photonic processor of claim 1, wherein the light source is configured to synchronously transmit the plurality of optical signals to the matrix multiplication unit.

3. The photonic processor of claim 1, wherein the matrix multiplication unit is configured to perform a static linear transformation on the plurality of optical signals.

4. The photonic processor of claim 1, wherein the Ising model is represented by a Hamiltonian:

$$H^{(K)} = -\Sigma_{1 \le i,j \le N} K_{ij} S_i S_j + \frac{1}{2} \Sigma_{1 \le i,j \le N} K_{ij},$$

where K is a coupling matrix representing interactions between elements of the Ising model and $S_j$ represents a spin of a $j^{th}$ element of the Ising model, and wherein the linear transformation unit is configured to multiply the plurality of optical signals with a matrix J based on the coupling matrix K.

5. The photonic processor of claim 4, wherein J is equal to the square root of $\tilde{K}$, which is a sum of K and a diagonal matrix $\Delta$.

6. The photonic processor of claim 1, further comprising:
a plurality of optical waveguides, in photonic communication with the matrix multiplication unit and the nonlinear thresholding unit, to feed the plurality of nonlinearly thresholded signals back into an input of the matrix multiplication unit.

7. The photonic processor of claim 1, wherein the perturbation unit comprises at least one photodetector to detect and perturb the plurality of linearly transformed optical signals via measurement noise.

8. The photonic processor of claim 1, wherein the light source comprises a pulsed laser having an output split into channels and an amplitude modulator to modulate each channel with a corresponding initial spin state.

9. The photonic processor of claim 1, wherein the matrix multiplication unit comprises a set of interconnected Mach-Zehnder interferometers or ring resonators integrated onto a semiconductor substrate.

10. The photonic processor of claim 1, wherein the nonlinear thresholding unit comprises a set of saturable absorbers.

11. The photonic processor of claim 1, further comprising:
a dot product unit, operably coupled to the nonlinear threshold unit, to take a dot product of the plurality of thresholded signals.

12. The photonic processor of claim 1, wherein the perturbation unit comprises at least one photodetector to convert the plurality of linearly transformed optical signals into electronic signals and is configured to perturb the electronic signals to yield the plurality of perturbed signals.

13. The photonic processor of claim 12, wherein the nonlinear thresholding unit is configured to electronically threshold the plurality of perturbed signals.

* * * * *